UNITED STATES PATENT OFFICE.

HERMAN P. MOORREES, OF NEW YORK, N. Y.

MOTOR-VEHICLE.

No. 803,009.  Specification of Letters Patent.  Patented Oct. 31, 1905.

Application filed February 24, 1905. Serial No. 247,084.

*To all whom it may concern:*

Be it known that I, HERMAN P. MOORREES, a subject of the Queen of the Netherlands, residing in the borough of Brooklyn, of the city of New York, in the State of New York, have invented certain new and useful Improvements in Motor-Vehicles, of which the following is a specification, reference being had to the accompanying drawings, forming a part hereof.

This invention relates to the driving mechanism of motor-vehicles and to the means for supporting the same, and is particularly concerned with electrically-operated motor-vehicles.

The object of the invention is to attain extreme simplicity in the construction and arrangement of the driving mechanism and its supports, to provide for complete rigidity of the supporting devices and avoid such disalinement of transmitting mechanism as might absorb power, to make all driving parts readily accessible, to make it easy to disassemble the parts when necessary for repairs, &c., and to provide for such compact arrangement that the working parts can be easily protected from dust.

The invention will be more fully explained hereinafter with reference to the accompanying drawings, in which it is illustrated as embodied in a convenient and practical form, and in which—

Figure 1:
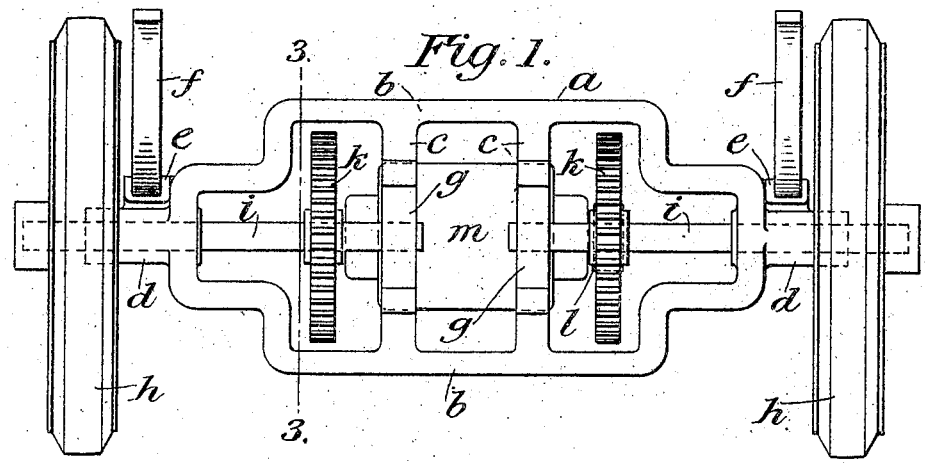
Figure 2:
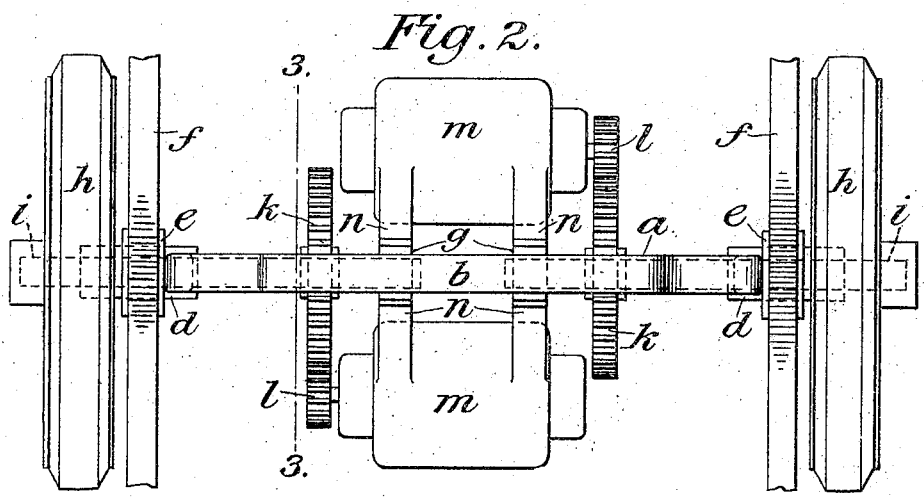
Figure 3:
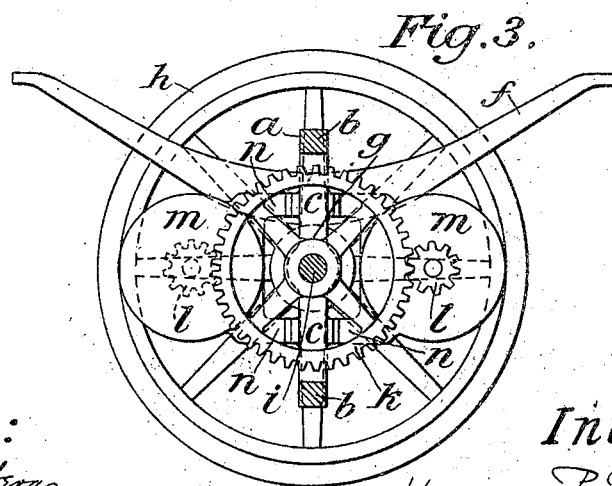

Figure 1 is a view in front elevation of so much of a motor-vehicle as is necessary to enable the application of the invention thereto to be understood. Fig. 2 is a plan view of the parts shown in Fig. 1. Fig. 3 is a section on the plane indicated by the line 3 3 of Figs. 1 and 2 looking toward the right.

In the embodiment of the invention shown in the drawings all of the driving mechanism, including the driving-wheels of the vehicle, is supported by a frame $a$, which may be made in one integral piece and is preferably truss-like in its structure, comprising upper and lower members $b$, united at points between the ends by a transverse member or transverse members $c$ and provided at its ends with bearings $d$ and spring-blocks $e$. The usual leaf-springs $f$ may be secured to the spring-blocks $e$ and may serve for the connection of the truck, composed of the frame $a$ and the parts carried by it, to the body of the vehicle. The transverse member or members $c$ of the frame are likewise provided with bearings, (indicated at $g$.)

The driving-wheels $h$ of the vehicle are carried, respectively, by independent axles $i$, which are journaled in the bearings $d$ and $g$ of the frame $a$, the bearings $d$ being preferably extended into the bearing planes of the wheels. At a convenient point each axle $i$ is provided with a gear $k$, through which and suitable transmission-gearing it may be driven from the source of power independently of the other axle, as through a compensating gear from a common motor or, as shown in the drawings, through a transmission-gear $l$ from an independent motor $m$. The motor or motors $m$ are supported directly by the frame $a$, the casing of each motor in the present instance being shown as provided with brackets $n$, by which it can be bolted directly to the transverse members $c$ of the frame.

It will be observed that the driving and transmitting mechanism is compactly and centrally arranged, so that it can be readily inclosed completely by a suitable casing secured to the frame $a$. Furthermore, the independent driving-axles $i$ are not only rigidly supported, but the transmission-gearing is disposed close to the center, so that any disalinement thereof which might consume power becomes practically impossible. Moreover, the driving mechanism is wholly independent of the relative movements of the body and truck, while at the same time the motor or motors are themselves properly supported with respect to the driving-wheels. The employment of transmission-shafts becomes wholly unnecessary, and the number of parts, both in the transmission mechanism and in the support therefor, is reduced to a minimum. All parts are readily accessible, and disassembling is easily effected in case of necessity.

It will be understood that the transmission-gears may be arranged otherwise than as shown, that the supporting-frame may be given such form as will best suit the conditions in any particular case, and that in other respects the details of construction may be varied without departing from the spirit of the invention.

I claim as my invention—

In a motor-vehicle, the combination of a frame having longitudinal members and transverse members, bearings carried at the ends of said frame and by said transverse members, means to secure said frame to the body of the vehicle, independent axles mounted in said bearings, driving-wheels carried by said axles, motors secured to said transverse members, and transmission-gearing between said motors and said axles respectively, substantially as described.

This specification signed and witnessed this 21st day of February, 1905.

HERMAN P. MOORREES.

In presence of—
 W. B. GREELEY,
 ANTHONY N. JESBERA.